(12) United States Patent
Lessly

(10) Patent No.: US 7,571,425 B2
(45) Date of Patent: Aug. 4, 2009

(54) AUTOMATED BINDING FOR OBJECT ORIENTED PROGRAMMING USER INTERFACE COMPONENTS

(75) Inventor: Roger T. Lessly, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 875 days.

(21) Appl. No.: 10/993,562

(22) Filed: Nov. 18, 2004

(65) Prior Publication Data

US 2006/0112399 A1   May 25, 2006

(51) Int. Cl.
G06F 9/44 (2006.01)
G06F 3/00 (2006.01)
(52) U.S. Cl. .................. 717/108; 717/107; 717/104; 719/318
(58) Field of Classification Search .............. 717/708, 717/104, 137, 162, 124, 108; 719/318
See application file for complete search history.

(56) References Cited

U.S. PATENT DOCUMENTS

| | | | | |
|---|---|---|---|---|
| 5,963,450 | A * | 10/1999 | Dew | 700/169 |
| 6,292,933 | B1 * | 9/2001 | Bahrs et al. | 717/107 |
| 6,678,887 | B1 * | 1/2004 | Hallman et al. | 717/162 |
| 6,694,482 | B1 * | 2/2004 | Arellano et al. | 715/251 |
| 6,779,177 | B1 * | 8/2004 | Bahrs et al. | 717/173 |
| 7,181,686 | B1 * | 2/2007 | Bahrs | 715/210 |
| 2003/0195997 | A1 * | 10/2003 | Ibert et al. | 709/318 |
| 2005/0240863 | A1 * | 10/2005 | Olander et al. | 715/513 |
| 2006/0047780 | A1 * | 3/2006 | Patnude | 709/219 |
| 2007/0174846 | A1 * | 7/2007 | Johnson et al. | 719/318 |

OTHER PUBLICATIONS

An Architecture for a Strict Model-View Separation in Java (1999), Egbert Althammer, Wolfgang Pree, from www.softwareresearch.net, 1999, CiteSeer, pp. 1-6.*
The UML Profile for Framework Architectures (2000), Marcus Fontoura, Wolfgang Pree, B. Rumpe, from http://citeseer.ist.psu.edu/fontoura00uml.html, 2002, CiteSeer, pp. 1-15.*
A Hybrid Approach to Adaptive User Interface Generation (2002), Guido Menkhaus, from http://citeseer.ist.psu.edu/555019.html, 2002,CiteSeer, pp. 1-8.*

(Continued)

Primary Examiner—Wei Y Zhen
Assistant Examiner—Satish Rampuria

(57) ABSTRACT

A method, system, and computer program product for automated binding of an application user interface to the data that it manipulates in an object oriented programming system is provided. In one embodiment, responsive to instantiating an application user interface, a binder object is constructed for at least one component in the application user interface. The binder mediates the exchange of data between the component and the corresponding field in the model. The binder monitors the component for data change events and monitors the model for data change and state change events from the field. The binding is specified by a moniker that is shared by the component and the field. Using the moniker, the binder synthesizes method names to get and set the field value and retrieve the field's state. The binder then locates and invokes, using introspection, the methods in the model that match the synthesized method names.

36 Claims, 8 Drawing Sheets

OTHER PUBLICATIONS

Chia-Chu Chiang, Development of reusable components through the use of adapters; IEEE, 2003, pp. 1-10.*

Bellavista et al., Dynamic binding in mobile applications; IEEE, vol. 7 Issue: 2, 2003, pp. 34-42.*

Althammer, E., et al., "Design and Implementation of a MVC-Based ARchitecture for E-Commerce Applications," International Journal of Computers and Applications, 2001, pp. 1-22, ACTA Press, Calgrary, Canada, online at http://www.softwareresearch.net/site/publications/J017.pdf on Feb. 15, 2006.

Althammer, Egbert, "Reflection Patterns in the Context of Object and Component Technology," Ph.D. Thesis, 2001, pp. 166-177, University of Konstanz, Germany, online at http://www.ub.uni-konstanz.de/v13/volltexte/2002/803//pdf/DissertaionEgbertAlthammer.pdf.

* cited by examiner

Model-Controller-View Structure

250

AUTOMATED BINDING FOR OBJECT ORIENTED PROGRAMMING USER INTERFACE COMPONENTS

BACKGROUND OF THE INVENTION

1. Technical Field

The present invention relates generally to computer software and, more particularly, to tools for improved object oriented programming.

2. Description of Related Art

JAVA® is an object-oriented programming language designed to generate applications that can run on all hardware platforms, small, medium and large, without modification. Developed by Sun Microsystems, JAVA® has been promoted and geared heavily for the Web, both for public Web sites and intranets. JAVA® was modeled after C++, and JAVA® programs can be called from within HTML documents or launched stand alone. When a JAVA® program called from a Web page runs on a user's machine, it is called a "JAVA applet." When it runs as a stand-alone, non Web-based program on a user's machine, it is simply a "JAVA application."

JAVA® was originally developed in 1991 as a language for embedded applications such as those used in set-top boxes and other consumer-oriented devices. It became the fuel to ignite a revolution in thinking when Sun transitioned it to the Web in 1994. JAVA® is a full-blown programming language like C and C++ and allows for the creation of sophisticated applications. Thus far, JAVA® applications and applets have been mildly successful at the client side, but Java on the server has become very popular. Sun's J2EE enterprise model has become an application server standard.

JAVA® embodies the "write once-run anywhere" model, which has been one of the Holy Grails of computing for decades. For example, a J2EE server application can be replicated from a Unix server to a Windows server and vice versa with relative ease. Sometimes, a little tweaking is necessary; sometimes a lot, but JAVA® is closer to "write once-run anywhere" than any development platform in the past.

When designing a JAVA® application, one problem that has to be overcome is connecting the User Interface (UI or view) to the data it displays. One solution is The Model-View-Controller (MVC) pattern. The MVC pattern is a widely accepted design pattern for connecting an application's UI to the data it manipulates. In MVC, a Controller object 104 is interposed between the Model 108 (the business object) and the View 106 to mediate the flow of data and events.

A great benefit of MVC is that it ensures the Model 108 is not dependant upon the View 106. This facilitates a separation of concerns for development and testing and enhances reusability. However, this benefit does not come without a cost—it introduces a rather complex object, the Controller 104. A typical View 106 may have many components and would require a lot of code in the Controller 104 to connect (i.e., bind) those components to their data sources and event handlers. Writing this Controller 104 code is a very tedious, time-consuming and error-prone process, and the resultant code can be difficult to maintain. It contributes little to the business functionality of the application—it is simply a technical necessity needed to 'wire' the View 106 to its data and event handlers.

Therefore, it would be desirable to have a method, system, and computer program product to improve programmer productivity by simplifying the development of Java User Interfaces.

SUMMARY OF THE INVENTION

The present invention provides a method, system, and computer program product for automated binding of an application user interface to the data that it manipulates in an object oriented programming system. In one embodiment, responsive to instantiating an application user interface, a binder object is constructed for at least one component in the application user interface. Preferably, a binder object is constructed for every component in the application user interface. The binder mediates the exchange of data between the component and the corresponding field in the model. The binder monitors the component for changes by registering as a listener for the component events indicating the value of the component has changed. The binder also monitors the model for data and state changes by registering with a notification dispatcher as a data change and state change listener of the model for the moniker of the bound field.

The binding is specified by a moniker that is shared by the component and the field. Using the moniker, the binder synthesizes method names to get and set the field value and retrieve the field's state. The binder then locates and invokes, using introspection, the methods in the model that match the synthesized method names.

Automation in this invention is achieved through the use of a program language feature called introspection, which allows a program to dynamically interrogate and discover the structure of an object at run time, without prior knowledge (that is, known at compile time) of the object. With introspection, it is possible for a running program, when presented with an unspecified object, to discover methods on that object, dynamically create links to the discovered methods, and then invoke the discovered methods. For the JAVA® language, in which the reference implementation of this invention was created, the introspection facility called Reflection. Hereafter, the terms 'introspection' and 'reflection' may be used interchangeably.

Using Introspection alleviates the need for a programmer to explicitly write the code that connects the user interface component to the data in the model. Instead, introspection allows this connection to be discovered and established at run-time.

The key to tying the connection together is the moniker assigned to the component. The moniker is a string that must match the base name of the get, set, and is-valid methods for the field in the model. The binder synthesizes these method names by appending prefixes (e.g., 'get' and 'set') and suffixes (e.g., 'IsValid') to the moniker and then uses introspection to locate the methods in the model. Once found, the methods can be invoked by the binder as appropriate in response to events generated by the component or model.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
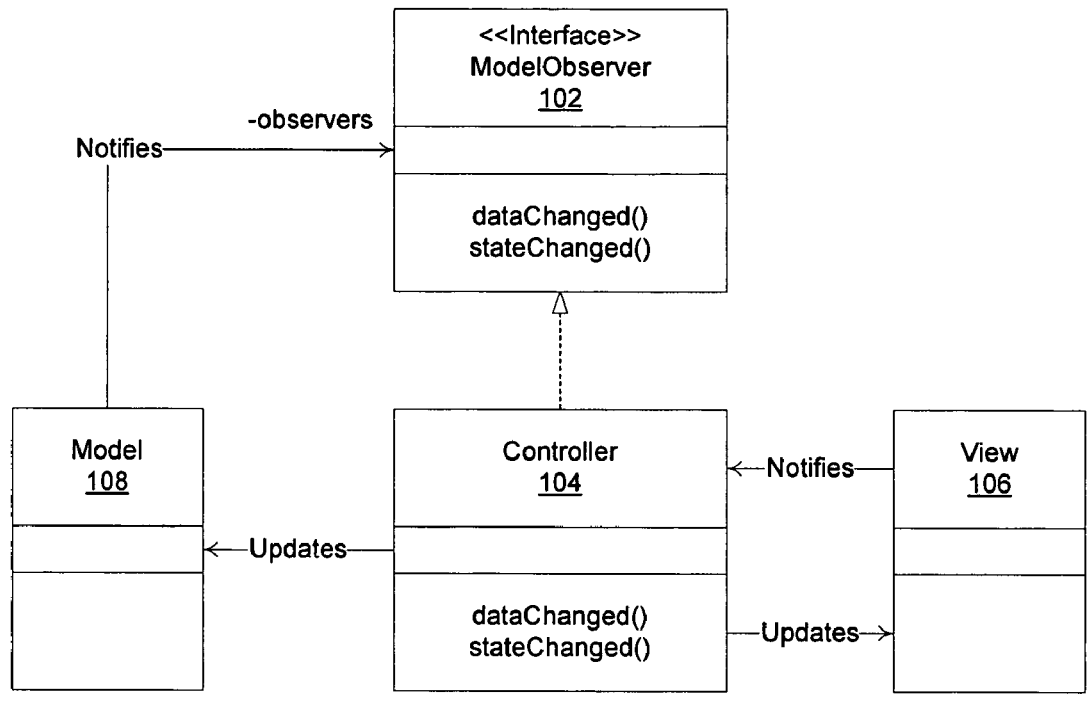
FIG. 1 depicts class diagram illustrating a prior art model-view-controller structure for connecting an application's user interface to the data it manipulates.
Figure 2A:
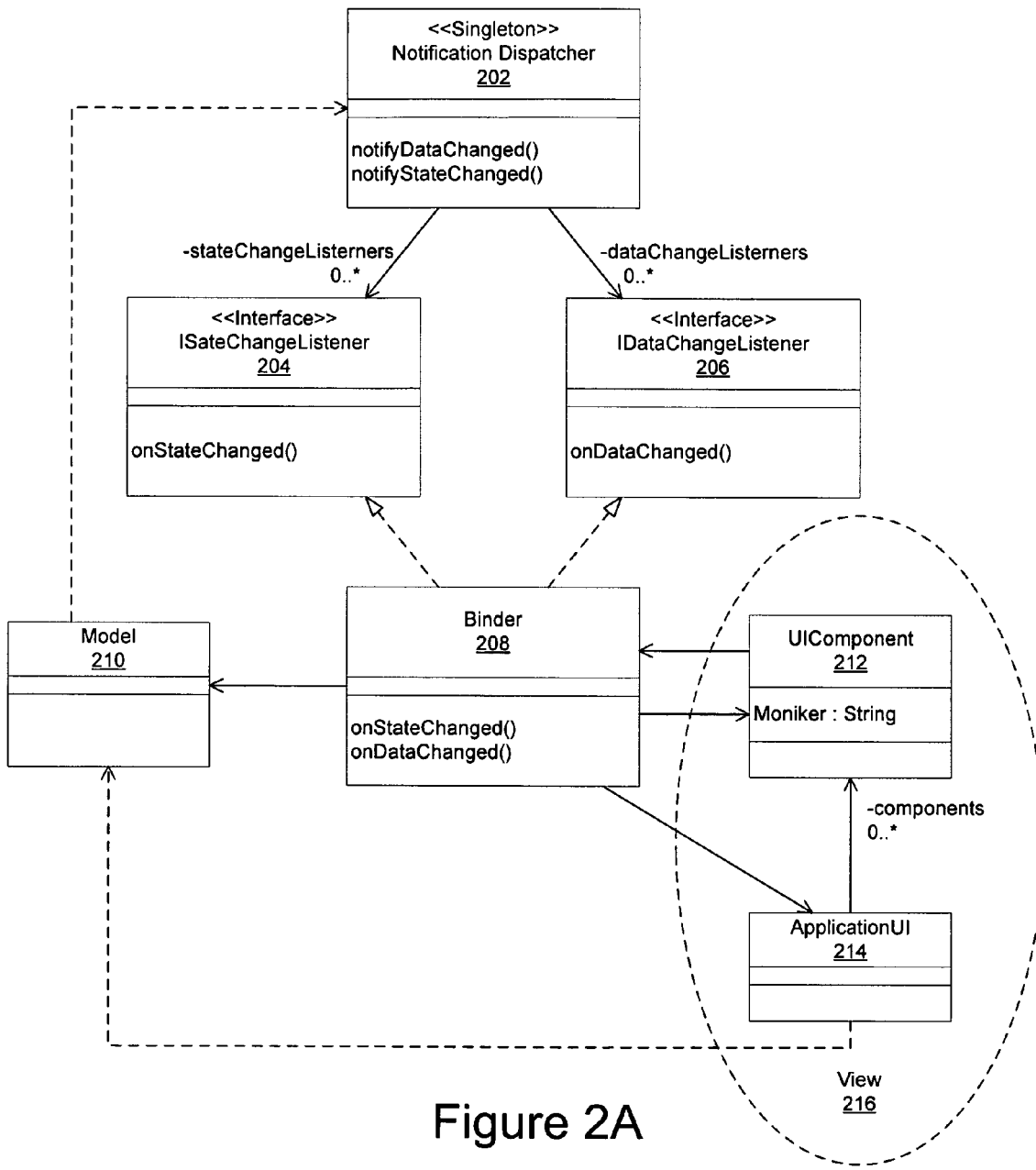
FIG. 2A depicts a conceptual class diagram depicting dynamic binding of a user interface to its data and event handlers in accordance with one embodiment of the present invention.

With reference now to the figures, and in particular with reference to FIG. 2A, a conceptual class diagram depicting dynamic binding of a user interface to its data and event handlers is depicted in accordance with one embodiment of the present invention. However, before embarking on a detailed description of the components illustrated in FIG. 2, a brief overview of object oriented technology and programming is provided for those unfamiliar with these concepts.

Object oriented technology is a methodology for designing and programming information systems. Object technology differs from traditional system design which separates the data from the processing. Although data and processing are naturally related since software causes the computer to process data, the traditional approach has been to design the databases separate and apart from the processing routines, often using different modeling and documentation tools.

In object technology, which is implemented using object-oriented programming tools, information systems are designed as building blocks that contain both the data and the processing (the "attributes" and the "methods"). For example, a customer object would contain customer data (name, address, etc.) and the kinds of processing that would take place for a customer (place order, request information, etc.) would also be built into the object.

Object Oriented Programming, often abbreviated as "OOP," is programming that supports object technology. It is an evolutionary form of modular programming with more formal rules that allow pieces of software to be reused and interchanged between programs. Major concepts are encapsulation, inheritance and polymorphism.

Encapsulation is the creation of self-sufficient modules that contain the data and the processing (data structure and functions that manipulate that data). These user-defined, or abstract, data types are called "classes." One instance of a class is called an "object." For example, in a payroll system, a class could be defined as Manager, and Pat and Jan, the actual objects, are instances of that class.

Classes are created in hierarchies, and inheritance allows the knowledge in one class to be passed down the hierarchy. That means less programming is required when adding functions to complex systems. If a step is added at the bottom of a hierarchy, then only the processing and data associated with that unique step needs to be added. Everything else about that step is inherited.

Object-oriented programming allows procedures about objects to be created whose exact type is not known until runtime. For example, a screen cursor may change its shape from an arrow to a line depending on the program mode. The routine to move the cursor on screen in response to mouse movement would be written for "cursor," and polymorphism would allow that cursor to be whatever shape is required at runtime. It would also allow a new shape to be easily integrated into the program.

Returning now to the present invention, a brief description of the following concepts—Passive View, Monikers, Component Binders, JAVA® reflection technology, Systematic naming methodology, and Single, standardized notification dispatcher—is provided in order to aid in understanding the present invention.

The Passive View 216 is composed of an Application User Interface (UI) 214 and its components 212. The View 216 is called passive because it neither manages business data nor implements business rules; it simply reflects changes in the Model 210 and responds to user input. Two types of changes in the Model 210 need to be reflected in the View 216: 1) data changes and 2) state changes. The View 216 reflects data changes when a UI component 212 is updated as the corresponding data value changes in the Model 210. The View 216 reflects state changes when a UI component 212 is enabled/disabled based on the kind of interactions allowed by the current state of the Model 210.

User input is manifested as events that are triggered by actions the user takes while interacting with the View 216, such as moving the mouse, clicking mouse buttons, typing in a field, etc. The View 216 responds to events of interest by invoking handler methods that correspond to the events. The event handler methods, in turn, typically invoke methods in the Model 210 that implement the corresponding behavior.

A moniker is a string that associates a UI component 212 with its data and event handlers. Both the UI component 212 in the View 216 and the data field in the Model 210 use the same moniker. A moniker is attached to a UI component 212 as one of its Bean properties (e.g., the 'Name' property). (Beans are JAVA® user interface components that conform to the Java Bean specification for publishing component properties.) The moniker is attached to a data field in the Model 210 implicitly through the names of its getter, setter, and is-valid methods.

Each UI component 212 has a Binder object 208 attached to it that is specific to the type of component (i.e., JTextField, JButton, JCheckbox, etc.). These binder objects 208 use the component's 212 moniker and JAVA® reflection technology to connect the component 212 to data access methods in the Model 210 and event handling methods in the View 216.

JAVA® reflection technology is used to dynamically bind a UI Component 212 in the View 216 to its data in the Model 210 and event handlers in the View 216. Method signatures for data access and event handling methods are constructed from the moniker (adding prefixes and suffixes as necessary) and JAVA® reflection is used to find the matching methods in the Model 210 or View 216.

A systematic naming methodology is used in order to ensure reliable automatic binding. A single, standardized notification dispatcher 202 routes change notifications from the Model 210 to the appropriate binders 208. This alleviates the need to implement the Observer pattern on the Model and serves to standardize the notification mechanism.

Figure 2B:
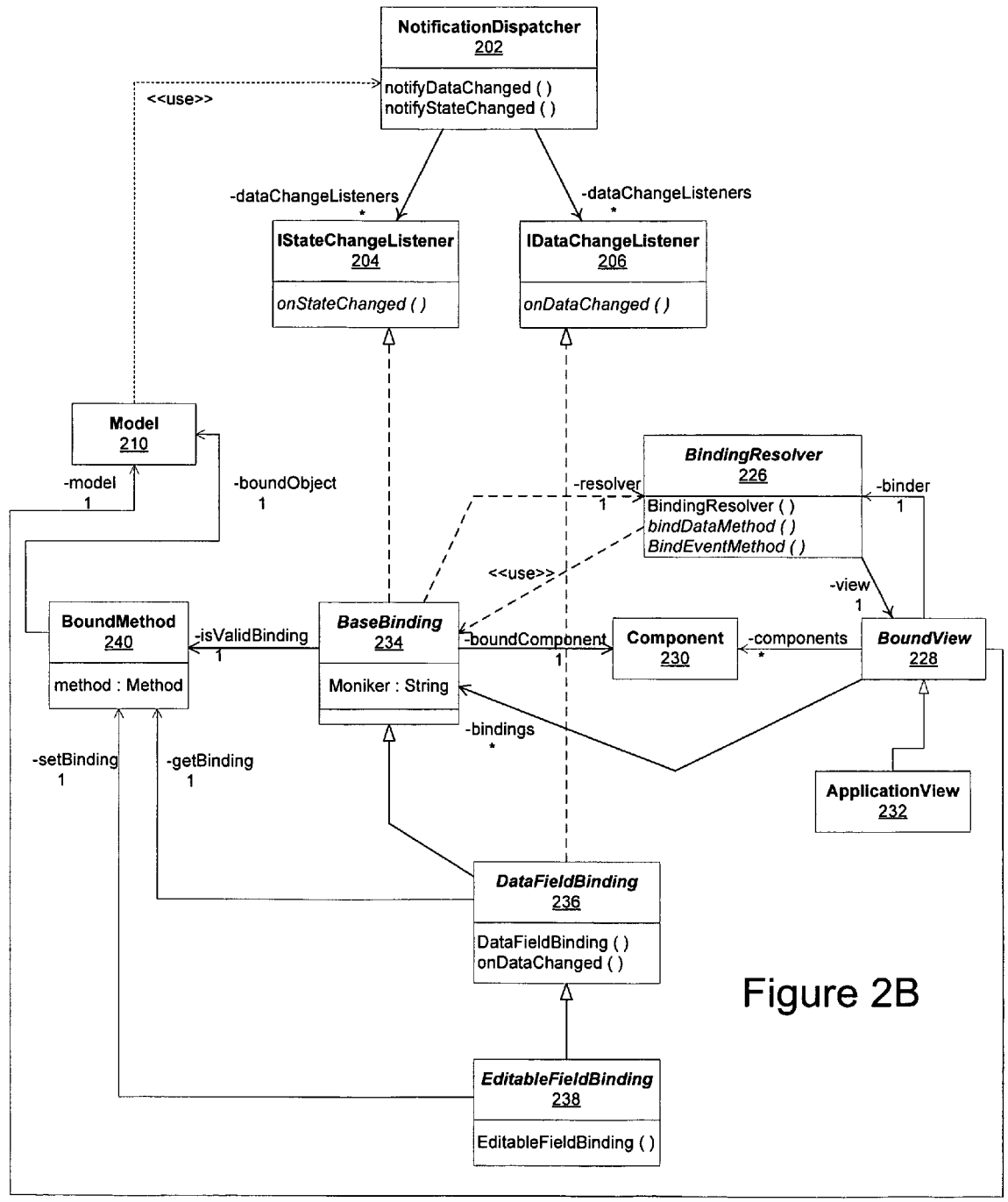
FIG. 2B depicts a conceptual class diagram depicting dynamic binding of a user interface to its data and event handlers illustrating more details than shown in FIG. 2A in accordance with one embodiment of the present invention.

With reference now to FIG. 2B, a conceptual class diagram depicting dynamic binding of a user interface to its data and event handlers illustrating more details than shown in FIG. 2A is depicted in accordance with one embodiment of the present invention. The application view class (ApplicationView) 232 must extend a BoundView class 228 that contains the logic for participating in the automated binding process. A BindingResolver object 226 assists the BoundView 228 and the binders in resolving bindings to data and event methods. A binder utilizes a BoundMethod object 240 to keep track of its bindings.

A binder is really a hierarchy of classes that implement different levels of binding—BaseBinding 234 only binds the is-valid method. This is suitable as a superclass for binders of UI components such as buttons that do not have data associated with them. DataFieldBinding 236 extends BaseBinding 234 and adds a binding for the get method. It is suitable as a superclass for binders of UI components such as labels and progress bars that display data from the model 210 but never update the model 210 (i.e., they are not editable). EditableFieldBinding 238 extends DataFieldBinding 236 and adds a binding for a set method. It is suitable as a superclass for binder of UI components such as text fields that both display and update data in the model 210.

Figure 2C:
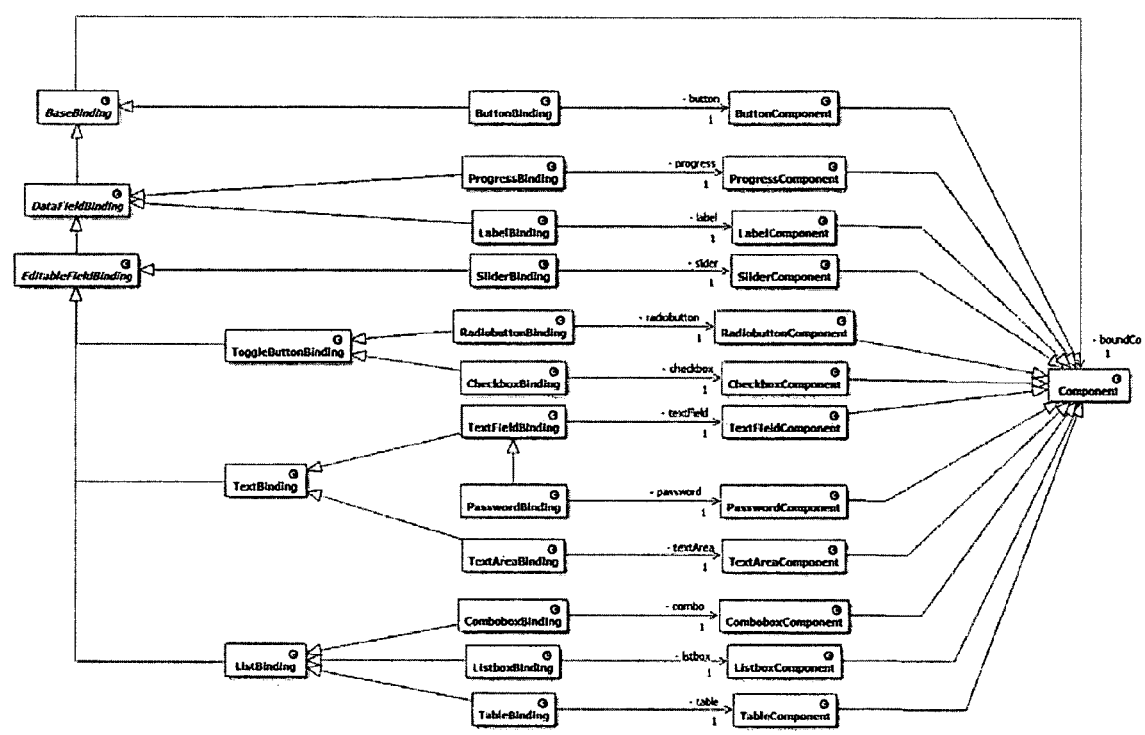
FIG. 2C depicts a UML class diagram showing more detail in the conceptual class hierarchy of component binders in accordance with one embodiment of the present invention.

With reference now to FIG. 2C, a UML class diagram showing more detail in the conceptual class hierarchy of component binders is depicted in accordance with one embodiment of the present invention. UML class diagram 250 shows that there are specific binders for each component type and that there may be intermediate binder classes for certain categories of binders (text-oriented components, list-oriented components, toggle oriented components). Each subclass adds additional functionality for controlling the flow the data between the specific UI component type and the model. They also add the auxiliary methods that are specific to each UI component type. Note that BaseBinding, DataFieldBinding, EditableFieldBinding, and Component are classes from the diagram illustrated in FIG. 2B.

Figure 3A:
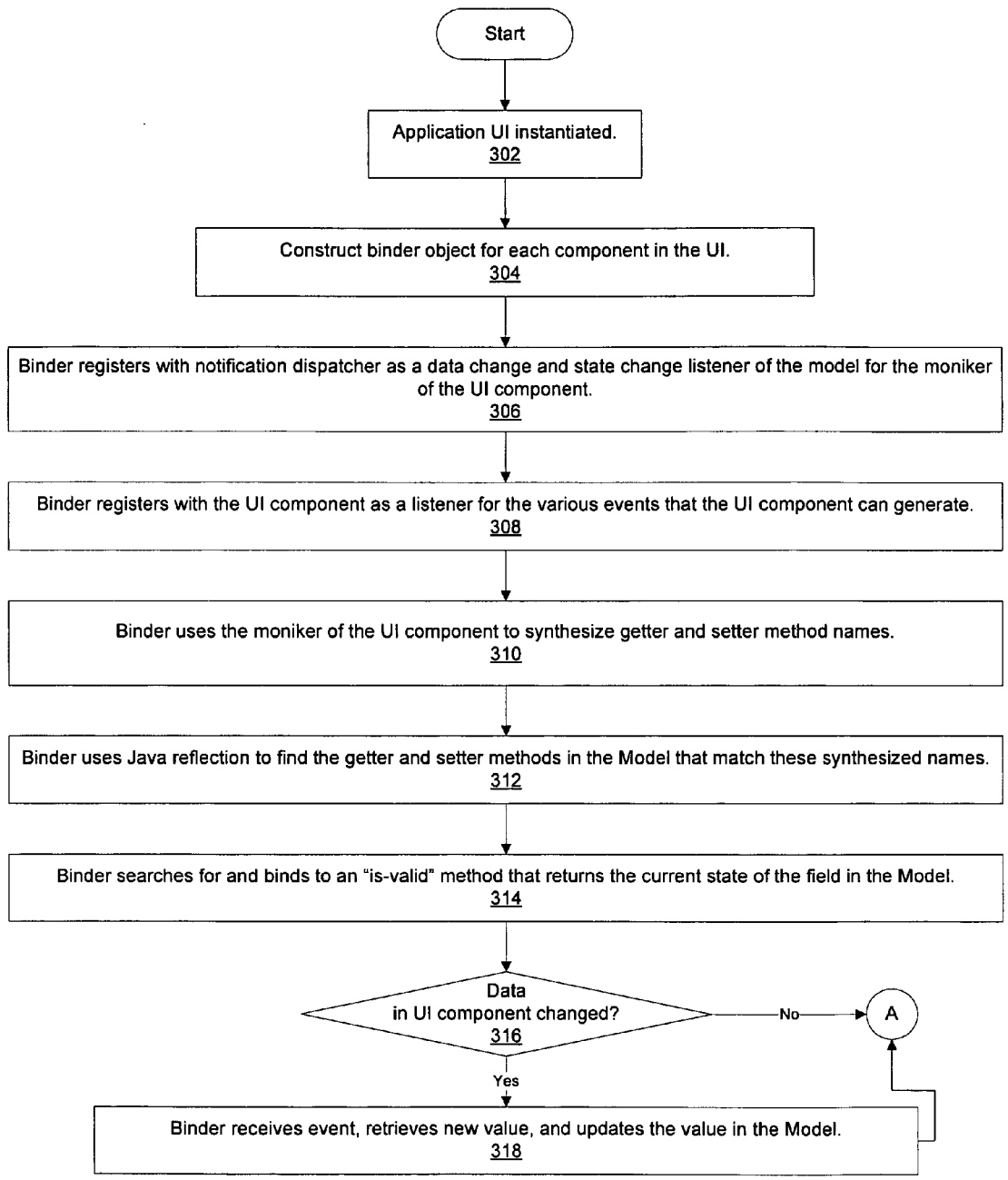
FIGS. 3A-3C depict a process flow and program function for connecting a Object Oriented Application's User Interface to the data it manipulates.
Figure 3B:
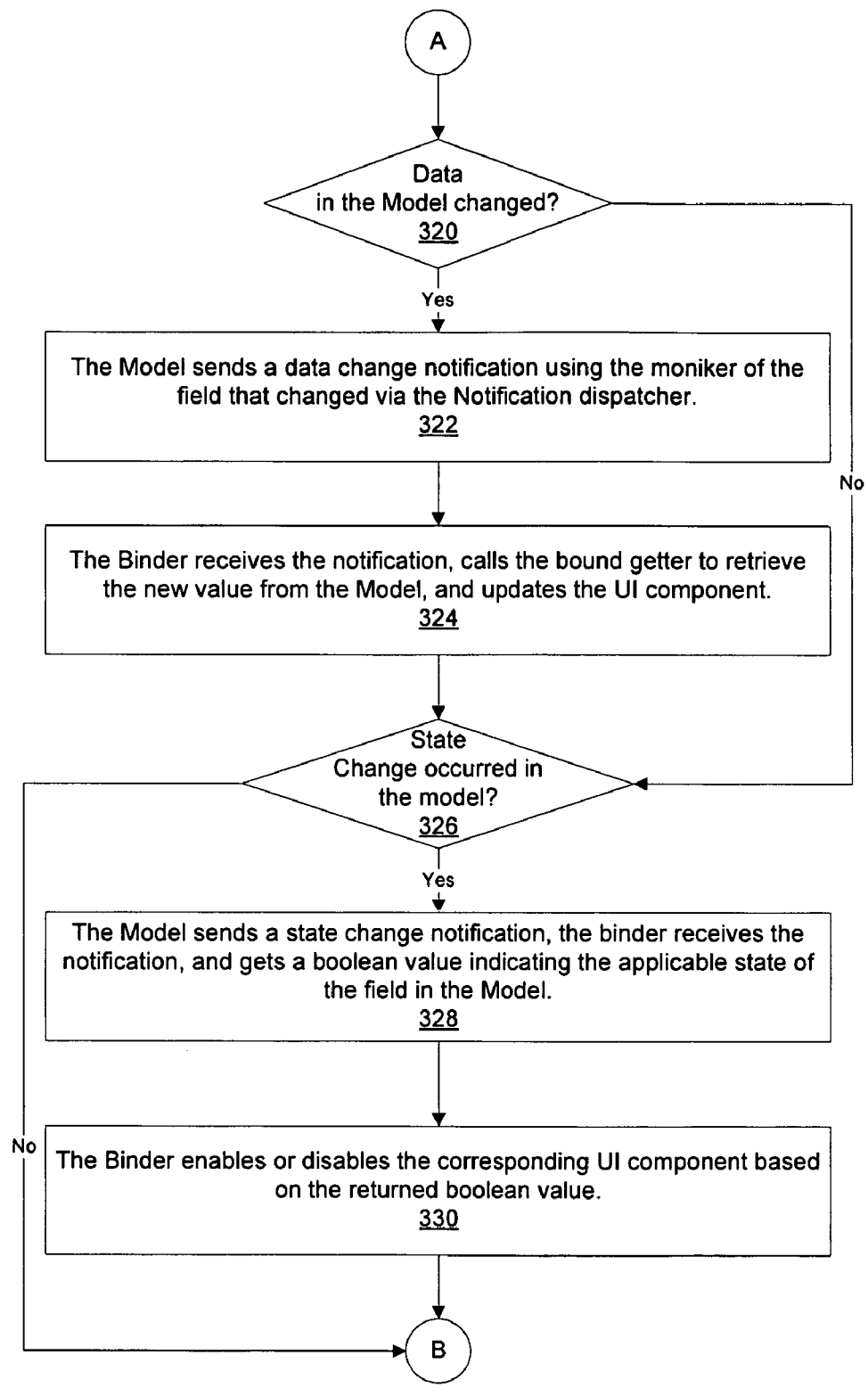
Figure 3C:
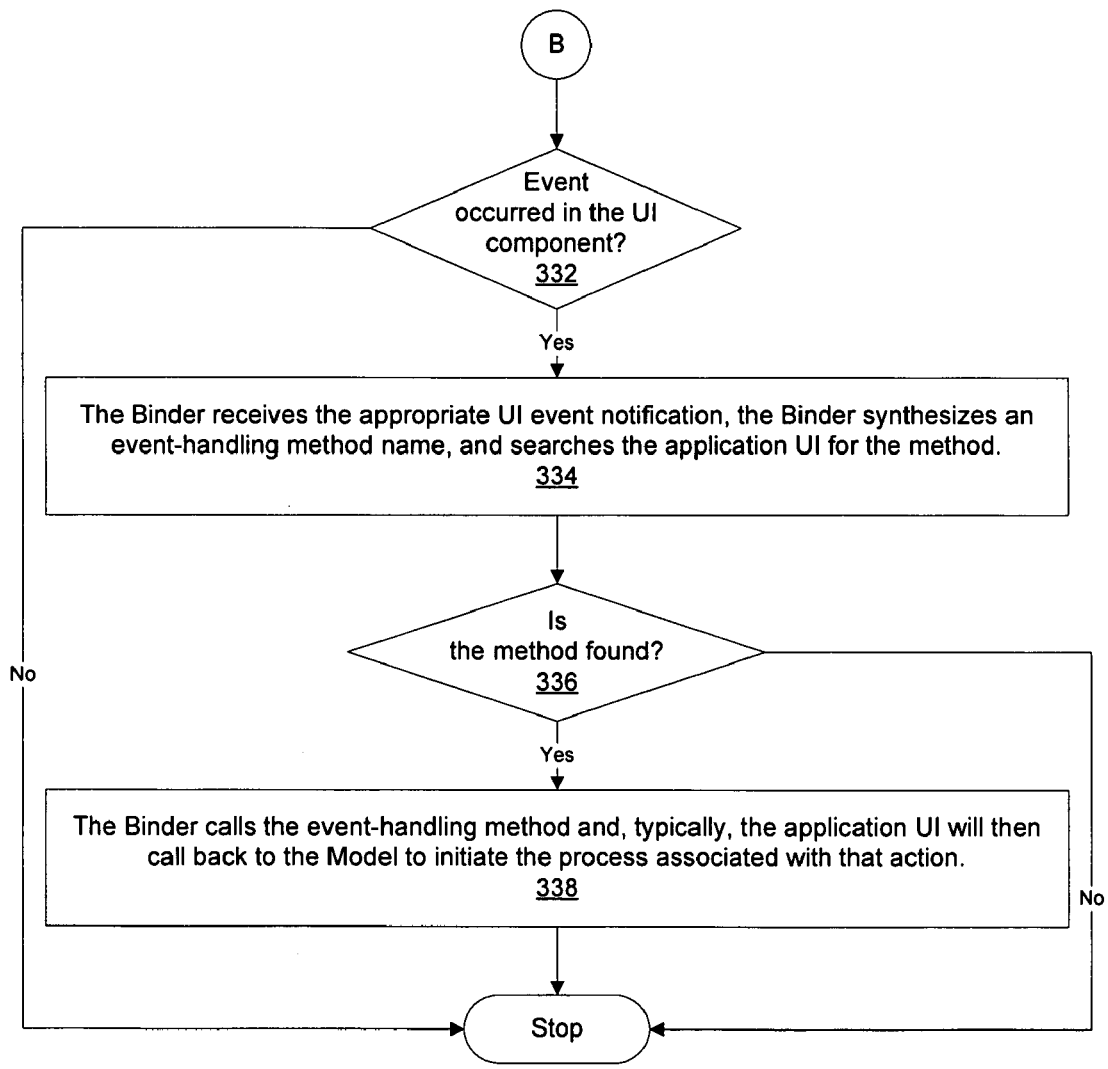

Returning now to FIG. 2A and with further reference to FIGS. 3A-3C, which depict process flow and program function diagrams for implementing the binding mechanism of the present invention, when an application UI 214 is instantiated (step 302), a binder object 208 is constructed for each component in the UI 214 (step 304). The binder 208 registers with the Notification Dispatcher 202 as a data change and state change listener 204 and 206 of the Model 210 for the moniker of the UI Component 212 (step 306). The Binder 208 also registers with the UI component 212 as a listener for the various events that the UI component 212 can generate (step 308). These can be data change events and/or events related to other user-initiated actions (e.g., mouse clicks). This allows the Binder 208 to mediate a 2-way dialog between the Model 210 and the View 216.

The Binder 208 uses the moniker of the UI Component 212 to synthesize getter and setter method names (step 310). The Binder 208 then uses JAVA® reflection to find the getter and setter methods in the Model 210 that match these synthesized names (step 312). The Binder also searches for and binds to an 'is-valid' method that returns the current state of the field in the Model 210 (step 314). This allows the Binder 208 to read and update the data value in the Model 210 and monitor its state.

When the data in the UI Component 212 changes (e.g., the user types in the field) (step 316), the Binder 208 receives the appropriate UI data change event, retrieves the new value from the UI Component 212, and calls the bound setter method (bound in steps 310-314) to update the value in the Model 210 (step 318). When the data in the Model 210 changes (step 320), the Model 210 sends a data change notification using the moniker of the field that changed via the Notification Dispatcher 202 (step 322). The Binder 208 receives the notification, calls the bound getter (bound in steps 310-314) to retrieve the new value from the Model 210, and updates the UI Component 212 (step 324).

When a state change occurs in the Model 210 that affects a particular field (step 326), the Model 210 sends a state change notification using the moniker of the field via the Notification Dispatcher 202. The binder receives the notification and calls the bound 'is-valid' method (bound in steps 310-314) to get a Boolean value indicating the applicable state of the field in the Model 210 (step 328). The Binder 208 then enables (true) or disables (false) the corresponding UI Component 212 based on the returned Boolean value (step 330).

When an event occurs in the UI Component 212 (e.g., the user clicks on a JButton) (step 332), the Binder 208 receives the appropriate UI event notification (via event listener registration in step 308), synthesizes an event-handling method name using the moniker of the component and the event type, and uses JAVA® reflection to search the Application UI 214 for the method (step 334). If the method is found (step 336), the Binder 208 calls the even-handling method, which typically calls back to the Model 210 to initiate the process associated with that action (step 338).

Although described primarily with reference to the get, set, and "is valid" methods, Binders, such as binder 208, may bind to more methods than these. For example, there are roughly three (3) categories of methods that can be bound:

a. Data methods—These are the get, set, and "is valid" methods, but can also include methods for populating list-oriented component (combo boxes, list boxes, tables, etc. . . . these are called "get-list" methods). These methods are bound primarily to methods in the model object.

b. Event methods—These are methods that handle user interface events generated by the various components in the user interface (e.g., the user types in a field or clicks the mouse cursor on a button). These methods are bound primarily to methods in the view object.

c. Auxiliary methods—These are optional methods that provide auxiliary information or handle binder-generated notifications. These methods may do things such as validate the maximum length of a text fields, handle errors detected by the binder, provide monikers for table columns, etc. . . . These methods may be bound to either the model or the view object as appropriate.

All binding, in this example, is done via JAVA® reflection using the moniker as the basis for synthesizing a method name. In each case, the moniker is 'decorated' with various prefixes and suffixes to create a method name that is then searched for in the binding target (either the model, the view, or both).

As an example, consider a text field (e.g. a JTextField JAVA® Swing component) that has a moniker of "LastName". The following method bindings would be attempted:

a. getLastName—[Data method] To get the value of the last name from the model. This is typically bound in the model object.

b. setLastName—[Data method] To set the value of the last name in the model. This is typically bound in the model object.

c. isLastName_Valid—[Data method] Is valid method to determine if the last name field applies in the current model context. This is typically bound in the model object.

d. onLastName_Action—[Event method] Handles the action event for the last name text field (action events occurs when the user presses the enter key while typing in the field). This is typically bound in the view object.

e. getLastName_MaxLength—[Auxiliary method] Returns the maximum allowable length for the last name field. This is typically bound in the model object since this model-specific information.

f. onLastName_LengthException—[Auxiliary method] Binder-generated notification that is sent when the user attempts to type text into the field that is longer the maximum allowable length returned by the getLastName_MaxLength method. This is typically bound in the view object because the response to the exception is usually to notify the user in some way (e.g., beep, post a status bar message, pop-up an error balloon, etc. . . . ).

A few other bindings are also attempted, but those listed above are sufficient for illustration purposes for those skilled in the art.

Figure 4:
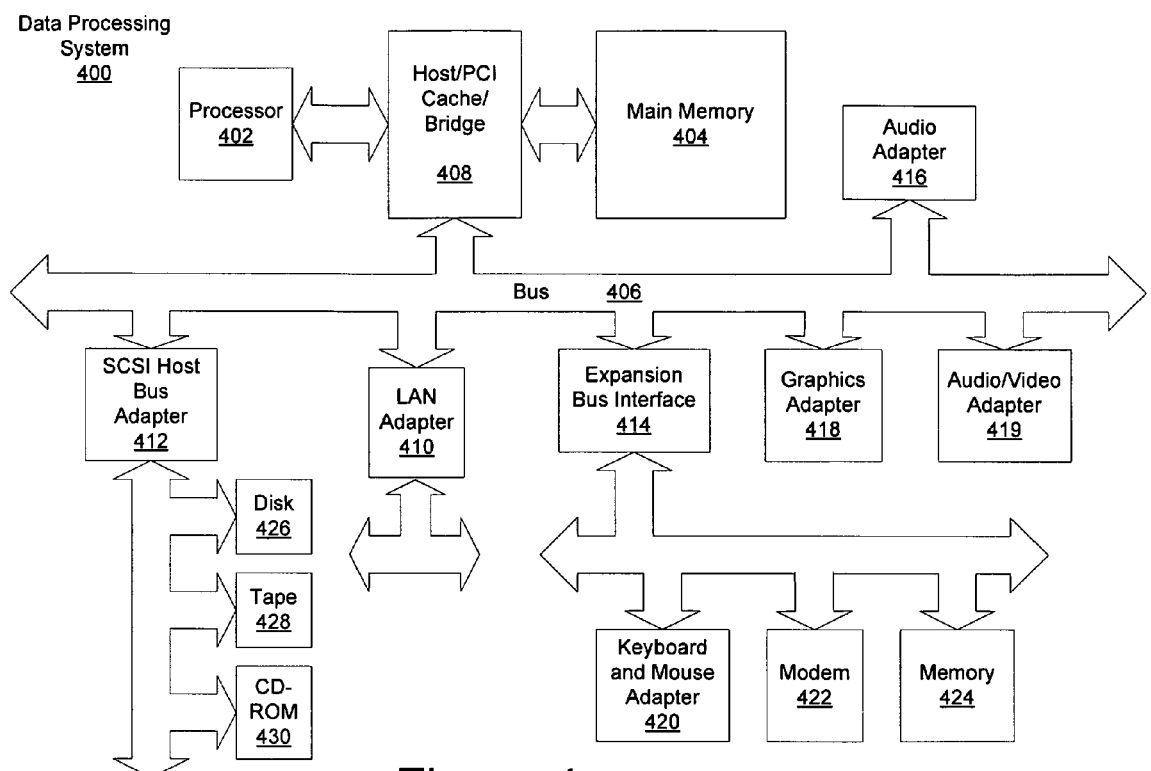
FIG. 4 depicts a block diagram of a data processing system in which the present invention may be implemented.

With reference now to FIG. 4, a block diagram of a data processing system in which the present invention may be implemented is illustrated. Data processing system 400 employs a peripheral component interconnect (PCI) local bus architecture and may be used by a software developer to develop object oriented code using the user interface to event handler binding mechanism of the present invention described above. Although the depicted example employs a PCI bus, other bus architectures, such as Micro Channel and ISA, may be used. Processor 402 and main memory 404 are connected to PCI local bus 406 through PCI bridge 408. PCI bridge 408 may also include an integrated memory controller and cache memory for processor 402. Additional connections to PCI local bus 406 may be made through direct component interconnection or through add-in boards. In the depicted example, local area network (LAN) adapter 410, SCSI host bus adapter 412, and expansion bus interface 414 are connected to PCI local bus 406 by direct component connection. In contrast, audio adapter 416, graphics adapter 418, and audio/video adapter (A/V) 419 are connected to PCI local bus 406 by add-in boards inserted into expansion slots. Expansion bus interface 414 provides a connection for a keyboard and mouse adapter 420, modem 422, and additional memory 424. In the depicted example, SCSI host bus adapter 412 provides a connection for hard disk drive 426, tape drive 428, CD-ROM drive 430, and digital video disc read only memory drive (DVD-ROM) 432. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system, such as Windows XP, which is available from Microsoft Corporation of Redmond, Wash. "Windows XP" is a trademark of Microsoft Corporation. An object oriented programming system, such as Java, may run in conjunction with the operating system, providing calls to the operating system from JAVA® programs or applications executing on data processing system 400. Instructions for the operating system, the object-oriented operating system, and applications or programs are located on a storage device, such as hard disk drive 426, and may be loaded into main memory 404 for execution by processor 402.

Those of ordinary skill in the art will appreciate that the hardware in FIG. 4 may vary depending on the implementation. For example, other peripheral devices, such as optical disk drives and the like, may be used in addition to or in place of the hardware depicted in FIG. 4. The depicted example is not meant to imply architectural limitations with respect to the present invention. For example, the processes of the present invention may be applied to multiprocessor data processing systems.

The traditional means for binding JAVA® UI components is to manually write a Controller class that monitors both the Model and the View, updating one in response to changes in the other. This typically involves creating listener objects for each component in the View to watch for certain events, and one or more listener objects to listen for changes in the Model. This is a very tedious, time-consuming, and error-prone process. Although, some IDEs, such as IBM's VisualAge for Java, can partially automate this process by generating some of the binding code, they still require hand-written code to complete the binding. However, the binding process of the present invention is completely automated and eliminates about 80% (or more) of this code on average. The 'wiring' code that remains in the present invention is much simplified compared to its traditional counterpart of coding Controllers.

The following sections contain a complete exemplary listing of the bindings that are performed on all bound User Interface (UI) components for both Swing and AWT in the JAVA® Reference implementation.

In the following descriptions, 'XXX' is a place-holder for the moniker, and 'type' is a place-holder for a model-specific data-type.

General Concepts

1. For data-oriented components, the getXXX method is the most fundamental binding. The binder always attempts to bind to it first. A comprehensive search is performed to find the getXXX method by first searching the UI object, then the data object bound to the UI object. If the binder fails to bind a getXXX method, no further bindings for any methods are attempted for that component.

2. After binding to a getXXX method, the binder will attempt to bind to a setXXX method. The binder only searches for the setXXX method on the same object as it found the getXXX method (this is a performance optimization and a reasonable assumption—i.e., the setXXX method is most likely on the same object as the getXXX method). Furthermore, the setXXX method must take an argument of the same type as returned by the bound getXXX method (this is another reasonable assumption).

The setXXX method is optional. If the binder fails to bind to a setXXX method, the component is essentially read-only—any data entered into the component will be ignored. However, the component can still be updated by any programmatic changes made to the bound data element in the model (of course, the model must post the appropriate value change notifications using the moniker of the component).

3. Every component can be bound to an isXXX_Valid method. This "is-valid" method provides a place for business rules or user interface rules that determine if the bound component should be editable or enabled. Often, certain data elements in the model cannot be changed or do not apply if other data elements contain certain values or if the model is in a particular state (e.g., editable vs. view-only). The is-valid method evaluates this criteria and returns true to indicate the bound component is enabled/editable, and false to indicate the bound component should be disabled/non-editable. Typically, text components are made editable/non-editable, most other components are enabled/disabled.

The isXXX_Valid method is bound and called by the binder when it is first initialized and then only in response to state-change notifications from the model. A state change notification should be posted by the model whenever values of other data elements in the model change that may affect the valid state for the data element represented by the moniker for this component. This typically occurs in the setXXX methods of the other data elements.

The isXXX_Valid method is optional. If the binder fails to bind to a isXXX_Valid method, all state change notifications for the moniker will be ignored.

4. In addition to the methods listed above, several components can be bound to additional optional methods that support formatting, simple edits, error handling, or other tasks that are appropriate (and relatively common) to the specific component type. All additional methods are optional.
5. Event binding methods are all optional. Event binding methods are only needed if the program needs to take special action beyond the standard handling of these events. However, for components that are primarily event-oriented (e.g., button components) events bindings methods are what need to be implemented to do anything useful.

Single-Line Text Component

AWT: TextField

Swing: JTextField

A single-line text component provides a space for the user to type text. Input is limited to a single line of text, but the line can be of arbitrary length.

Data Bindings type getXXX( )—Returns the value of the bound data element in the model. Called by the binder to update the value displayed in the text component from the value of the bound data element in the model. The return value can be String, Date, or a JAVA® numerical data type (short, int, long, float, double, Integer, Long, Float, Double). The binder will perform an appropriate conversion from the return type to a text value that can be displayed in the component.

void setXXX(type value)—Sets the value bound data element in the model. Called by the binder to update the value of the bound data element in the model from the value in the text component. The argument type can be String, Date, or a Java numerical data type (short, int, long, float, double, Integer, Long, Float, Double). The binder will perform an appropriate conversion from the text value in the component to the argument's type. If the field binds to a type other than String, input filtering is performed and a format exception can occur if the user types a character that is not valid for the bound data type, such as typing an alphabetic character in a numeric field (see onXXX_Format Exception).

boolean setXXX(type value)—Alternative form of the setXXX method. This version returns a boolean value indicating if the set operation was successful. This allows the setXXX method to perform rudimentary edits to determine the validity of the argument. A return value of true indicates the argument was accepted, while false indicates the argument was rejected. If false is returned, the binder responds by notifying the user that an error occurred (see onXXX_ SetException).

boolean isXXX_Valid( )—Determines if the bound data element in the model is valid for the current state of the model. If this method returns true, the text component is made editable. If false, the component is made non-editable. Note that for text components, non-editable and disabled may be different concepts. A non-editable text field can still accept focus allow the user to scroll the text in the component and copy it, but not edit it. By contrast, a disabled text component permits no user interaction at all. A non-editable text component is typically displayed with dark text on a dimmed background while a disabled text component is displayed with dimmed text on a dimmed background.

Event Bindings void onXXX_Action( )—Called by the binder to invoke the action event for the component. The action event is triggered whenever the user presses the return key in the component.

void onXXX_KeyTyped( )—Called by the binder whenever a key is typed in the component.
  Note: Implementing this method is not recommended for most situations as the standard getXXX/setXXX binding protocol is sufficient to handle most key type events.

void onXXX_TextChange( )—Called by the binder whenever the text in the component is changed (either by the use or programmatically).
  Note: Implementing this method is not recommended for most situations as the standard getXXX/setXXX binding protocol is sufficient to handle most text change events.

Auxiliary Bindings void onXXX_SetException(Object value)—Called by the binder to handle an exception in the setXXX method (see setXXX), i.e., the setXXX method returned false. The argument is the same argument that was passed to the setXXX method. This method allows custom and/or additional processing for handling a set exception. If the binder fails to bind to a onXXX_SetException method, the default behavior is to beep.

int getXXX_MaxLength( )—Returns the maximum allowed length for the bound data element in the model. Used to limit the length of the text that can be typed into the text component. This method is only bound and called once when the binder is first initialized. If a character is typed that would cause the length of the text in component to exceed the maximum length specified by this method, the binder rejects the character and attempts to bind to the onXXX_LengthException (see) method for handling the exception. If unable to bind to the onXXX_LengthException, the default handler beeps.

The getXXX_MaxLength method is optional. If the binder fails to bind to a getXXX_MaxLength method, the component no length checking is performed.

void onXXX_LengthException( )—Called by the binder to handle a length exception (see getXXX_MaxLength) for the bound data element in the model. This method allows custom and/or additional processing for handling a length exception. If the binder fails to bind to a onXXX_LengthException method, the default behavior is to beep.

void onXXX_FormatException( )—Called by the binder to handle a formatting exception for the bound data element in the model. A formatting exception can occur if the user types a character that is not valid for the data element type, such typing an alphabetic character in a numeric field. This method allows custom and/or additional processing for handling a format exception (e.g., display a status bar message, change color of the component label, etc. . . . ). If the binder fails to bind to a onXXX_FormatException method, the default behavior is to beep.

void onXXX_FormatValid( )—Called by the binder to when a new value for the bound data element in the model is successfully formatted for display. This method provides a place for the UI to clean-up after handling a format exception (e.g., erase a status bar message, change color of the component label back to normal, etc. . . . ). If the binder fails to bind to a onXXX_FormatValid method, the default behavior is to do nothing.

Password Text Component

AWT: N/A

Swing: JPasswordField

A password text component is similar to a single-line text component except that the characters typed by the user are replaced with a place-holder character when displayed (the original characters are still stored, just not displayed). Also, certain user editing operations are disabled (e.g., cut and copy) for security reasons. The bindings for a password component are the same as those that apply to a regular single-line text component (see Single-line Text Component).

Multi-Line Text Component

AWT: TextArea

Swing: JTextArea

A multi-line text component provides a space for the user to type arbitrary text with unlimited number of lines and unlimited overall length.

Data Bindings

String getXXX( )—Returns the value of the bound data element in the model. Called by the binder to update the value displayed in the text component from the value of the bound data element in the model. The return value is always a String.

void setXXX(String value)—Sets the value bound data element in the model. Called by the binder to update the value of the bound data element in the model from the value in the text component. The argument type is always String.

boolean setXXX(String value)—Alternative form of the setXXX method. This version returns a boolean value indicating if the set operation was successful. This allows the setXXX method to perform rudimentary edits to determine the validity of the argument. A return value of true indicates the argument was accepted, while false indicates the argument was rejected. If false is returned, the binder responds by notifying the user that an error occurred (see onXXX_SetException).

boolean isXXX_Valid( )—Determines if the bound data element in the model is valid for the current state of the model. If this method returns true, the text component is made editable. If false, the component is made non-editable. Note that for text components, non-editable and disabled may be different concepts. A non-editable text field can still accept focus allow the user to scroll the text in the component and copy it, but not edit it. By contrast, a disabled text component permits no user interaction at all. A non-editable text component is typically displayed with dark text on a dimmed background while a disabled text component is displayed with dimmed text on a dimmed background.

Event Bindings void onXXX_Action( )—Called by the binder to invoke the action event for the text component. The action event is triggered whenever the user presses the enter key while the text component has focus.

void onXXX_KeyTyped( )—Called by the binder whenever a key is typed in the component.

Note: Implementing this method is not recommended for most situations as the standard getXXX/setXXX binding protocol is sufficient to handle most key type events.

void onXXX_TextChange( )—Called by the binder whenever the text in the component is changed (either by the user or programmatically).

Note: Implementing this method is not recommended for most situations as the standard getXXX/setXXX binding protocol is sufficient to handle most text change events.

Auxiliary Bindings void onXXX_SetException(Object value)—Called by the binder to handle an exception in the setXXX method (see setXXX), i.e., the setXXX method returned false. The argument is the same argument that was passed to the setXXX method. This method allows custom and/or additional processing for handling a set exception. If the binder fails to bind to a onXXX_SetException method, the default behavior is to beep.

int getXXX_MaxLength( )—Returns the maximum allowed length for the bound data element in the model. Used to limit the length of the text that can be typed into the text component. This method is only bound and called once when the binder is first initialized. If a character is typed that would cause the length of the text in component to exceed the maximum length specified by this method, the binder rejects the character and attempts to bind to the onXXX_LengthException (see) method for handling the exception. If unable to bind to the onXXX_LengthException, the default handler beeps. The getXXX_MaxLength method is optional. If the binder fails to bind to a getXXX_MaxLength method, the component no length checking is performed.

void onXXX_LengthException( )—Called by the binder to handle a length exception (see getXXX_MaxLength) for the bound data element in the model. This method allows custom and/or additional processing for handling a length exception. If the binder fails to bind to a onXXX_LengthException method, the default behavior is to beep.

Label Component

AWT: Label

Swing: JLabel

Label components display text but provide no ability for the user to edit the text. Label components are inherently read-only, so it has no setXXX binding.

Data Bindings type getXXX( )—Returns the value of the bound data element in the model. Called by the binder to update the value displayed in the label component from the value of the bound data element in the model. While a label is intended for String values, the return value can be of any type—a toString( ) operation is performed on the returned object to convert it to displayable text.

boolean isXXX_Valid( )—Determines if the bound data element in the model is valid for the current state of the model. For labels, if this method returns true the label is displayed in dark text. If false, the label is displayed in dimmed text.

Event Bindings

Label components are passive and generate no events.

Button Component

AWT: Button

Swing: JButton

Button components do not represent data so there are no getXXX and setXXX bindings. Instead, a button is primarily an event-oriented component. As such, the most important binding for the button is the onXXX_Action method. The isXXX_Valid method is still used to enable/disable the button.

Data Bindings boolean isXXX_Valid( )—Determines if the bound data element in the model is valid for the current state of the model. For buttons, if this method returns true the button is enabled. If false, the button is disabled.

Event Bindings void onXXX_Action( )—Called by the binder to invoke the action event for the button component. The action event is triggered whenever the user clicks the mouse pointer in the button component or presses the button activation key (typically the enter key or the space bar) while the button component has focus.

void XXX( )—Alternative form of the onXXX_Action method. This signature uses the button's moniker as the exact method name to be called. This can be used if the method for handling the button's action can be exactly specified by the moniker.

Note that although this is an event binding method, it allows for the handling method to be in the model. It is not normally recommended to put event handling methods in the model since events are UI artifacts and models should be UI agnostic. Occasionally, however, the exact code for handling the button action is already in a pre-existing model method. This form of the action method allows that method in the model to be called directly, bypassing the need to a create a wrapper method in the UI that conforms to the normal onXXX_Action signature. Use with care!

Checkbox Component

AWT: Checkbox

Swing: JCheckBox

A checkbox component allows the user to specify a Boolean value by checking or un-checking (clearing) the component. A checkbox always represent a true/false value.

Data Bindings boolean getXXX( )—Returns the value of the bound data element in the model. Called by the binder to update the value displayed in the checkbox component from the value of the bound data element in the model. The return value is always a boolean. If the return value is true the checkbox is checked, if false the checkbox is unchecked (cleared).

boolean isXXX( )—Alternative form of the getXXX applicable for checkbox components. This form more closely matches the common idiom employed in object-oriented programs for retrieving Boolean values and is the preferred method signature to use for checkbox components. Note that binder will first attempt to bind to a method with this signature before attempting to bind to the getXXX method.

void setXXX(boolean value)—Sets the value of the bound data element in the model. Called by the binder to update the value of the bound data element in the model from the value in the checkbox component. The argument type must be a boolean. If the checkbox is checked a true value is passed, if un-checked (cleared) a false value is passed.

boolean setXXX(boolean value)—Alternative form of the setXXX method. This version returns a boolean value indicating if the set operation was successful. This allows the setXXX method to perform rudimentary edits to determine the validity of the argument. A return value of true indicates the argument was accepted, while false indicates the argument was rejected. If false is returned, the binder responds by notifying the user that an error occurred (see onXXX_SetException).

boolean isXXX_Valid( )—Determines if the bound data element in the model is valid for the current state of the model. If this method returns true, the checkbox component is enabled. If false, the checkbox component is disabled.

Event Bindings void onXXX_Check( )—Called by the binder whenever the checkbox is checked or un-checked. This method does not indicate which action occurred (i.e., check or un-check). If that information is needed, the actual checkbox component must be interrogated for its checked state. This method allows custom and/or additional processing for check/un-check events. Note: Implementing this method is not recommended for most situations as the standard getXXX/setXXX binding protocol is sufficient to handle most check/un-check events.

Auxiliary Bindings void onXXX_SetException(Object value)—Called by the binder to handle an exception in the setXXX method (see setXXX), i.e., the setXXX method returned false. The argument is the same argument that was passed to the setXXX method. This method allows custom and/or additional processing for handling a set exception. If the binder fails to bind to a onXXX_SetException method, the default behavior is to beep.

Option Button Component

AWT: Checkbox in a CheckboxGroup

Swing: JRadioButton

An option button component (a.k.a. a radio-button component) is similar to a checkbox in that it is a Boolean component. However, option buttons always appear in groups. The option buttons in the group are always mutually-exclusive—only one can be selected at a time. Selecting one automatically deselects all others. This allows the user to select one option from a set of mutually-exclusive options. An option button always represent a true/false value.

Due the inherent mutually-exclusive, group nature of option buttons, they are handled a little differently than most other stand-alone components. As with other components, each option button is bound to its own set of get and set methods. However, in the model, these get/set methods are all reference the same data element. Therefore, it is only necessary for an option button component binder to respond to selection events, never de-selection events.

Data Bindings boolean getXXX( )—Returns the value of the bound data element in the model. Called by the binder to update the value displayed in the option button component from the value of the bound data element in the model. The return value is always a boolean. If the return value is true the option button is selected, if false the option button is deselected.

boolean isXXXSelected( )—Alternative form of the getXXX method applicable for option button components. This form uses a name that more closely matches the behavior of option button components and is the preferred signature to use. Note that binder will first attempt to bind to a method with this signature before attempting to bind to the getXXX method.

void setXXX(boolean value)—Sets the value of the bound data element in the model. Called by the binder to update the value of the bound data element in the model from the value in the option button component. The argument type must be a boolean. If the option button is selected a true value is passed, if deselected a false value is passed.

boolean setXXX(boolean value)—Alternative form of the setXXX method. This version returns a boolean value indicating if the set operation was successful. This allows the setXXX method to perform rudimentary edits to determine the validity of the argument. A return value of true indicates the argument was accepted, while false indicates the argument was rejected. If false is returned, the binder responds by notifying the user that an error occurred (see onXXX_SetException).

void selectXXX( )—Alternative form of the setXXX method applicable for option button components. This form uses a name that more closely matches the behavior of option button components and is the preferred signature to use. This method is only called if when the option button is selected, (equivalent to calling setXXX(true)). Note that binder will first attempt to bind to a method with this signature before attempting to bind to the getXXX method.

boolean selectXXX( )—Alternative form of the selectXXX method that returns a boolean value indicating if the set operation was successful. This allows the setXXX method to perform rudimentary edits to determine the validity of the argument. A return value of true indicates the argument was accepted, while false indicates the argument was rejected. If false is returned, the binder responds by notifying the user that an error occurred (such as by beeping).

boolean isXXX_Valid( )—Determines if the bound data element in the model is valid for the current state of the model. If this method returns true, the checkbox component is enabled. If false, the checkbox component is disabled.

Event Bindings void onXXX_Check( )—Called by the binder whenever the option button is selected or deselected. This method does not indicate which action occurred (i.e., select or deselect). If that information is needed, the actual option button component must be interrogated for its selection state. This method allows custom and/or additional processing for select/deselect events.

Note: Implementing this method is not recommended for most situations as the standard getXXX/setXXX binding protocol is sufficient to handle most select/deselect events.

Auxiliary Bindings void onXXX_SetException(Object value)—Called by the binder to handle an exception in the setXXX method (see setXXX), i.e., the setXXX method returned false. The argument is the same argument that was passed to the setXXX method. This method allows custom and/or additional processing for handling a set exception. If the binder fails to bind to a onXXX_SetException method, the default behavior is to beep.

Drop-Down Selection Component

AWT: Choice

Swing: JComboBox

An drop-down selection component (a.k.a. combo box component) allows the user to choose one item from a list of items. The list of choices normally is not visible until the user activates a control on the component to expose the list (i.e., the list 'drops-down').

Drop-down selection have an additional requirement to populate the drop down list with choices. The list is populated by binding to a getXXXList method that returns an Iterator over the collection of items to display in the list. The items in the list can be of any type (usually they are of a model-defined type). The binder will translate the list items into Strings suitable for display in the list. It will do it first by attempting to bind to a getXXXDisplayString method that can translate the object into a Sting, If that fails, it will simply do a toString( ) on the list item. The binder then associates a list object (as returned by the getXXXList method) with its corresponding display string so that it can perform list selections based on data values rather than string values.

Data Bindings

Iterator getXXXList( )—Called by the binder to retrieve the list of elements to display in the drop-down list. The getXXXList method is call to initially load the drop-down list, and subsequently reloads the list whenever a list change notification is posted with the moniker of the component. All elements in the returned list must be of the same type (or a subtype of) the first element in the list.

type getXXX( )—Returns the value of the bound data element in the model. Called by the binder to update the selection displayed in the drop-down selection component from the value of the bound data element in the model. The return value can be of any type (typically a model-defined type), but it must match the element type returned by the getXXXList method. The return value is compared to the binder's list of stored data objects (via equals( )) to select the corresponding item in the drop-down list. If no matching data object is found (or null is returned), the existing drop-down list selection is removed and the drop-down selection component has no selection.

void setXXX(type value)—Sets the value of the bound data element in the model. Called by the binder to update the value of the bound data element in the model from the selection in the drop-down selection component. The argument type can be of any type, but it must match the type returned by the getXXX method. If there is no selection in the drop-down list component, the argument value is null.

boolean setXXX(type value)—Alternative form of the setXXX method. This version returns a boolean value indicating if the set operation was successful. This allows the setXXX method to perform rudimentary edits to determine the validity of the argument. A return value of true indicates the argument was accepted, while false indicates the argument was rejected. If false is returned, the binder responds by notifying the user that an error occurred (see onXXX_SetException).

boolean isXXX_Valid( )—Determines if the bound data element in the model is valid for the current state of the model.

If this method returns true, the drop-down selection component is enabled. If false, the drop-down selection component is disabled.

Event Bindings void onXXX_SelChange( )—Called by the binder whenever the selection in the combo box changes. This method allows custom and/or additional processing for list selection events.

Note: Implementing this method is not recommended for most situations as the standard getXXX/setXXX binding protocol is sufficient to handle most list selection events.

Auxiliary Bindings void onXXX_SetException(Object value)—Called by the binder to handle an exception in the setXXX method, i.e., the setXXX method returned false. The argument is the same argument that was passed to the setXXX method. This method allows custom and/or additional processing for handling a set exception. If the binder fails to bind to a onXXX_SetException method, the default behavior is to beep.

String getXXXDisplayString(Object o)—Called by the binder to translate a list item returned by the getXXXList method into a suitable display string. This method allows display strings for list item to be customized. The list item object is passed as the argument. The method should return a String containing the appropriate text to display in the drop-down list for that object. If the binder fails to bind to a getXXXDisplayString method, the default behavior is to do a toString on the list item object.

List Component

AWT: List

Swing: JList

A list component displays a list of strings and allows the user to make one or more selections. List components have an additional requirement to populate the list with choices. The list is populated by binding to a getXXXList method that returns an Iterator over the collection of items to display in the list. The items in the list can be of any type (usually they are of a model-defined type). The binder will translate the list items into Strings suitable for display in the list. It will do it first by attempting to bind to a getXXXDisplayString method that can translate the object into a Sting, If that fails, it will simply do a toString( ) on the list item. The binder then associates a list object (as returned by the getXXXList method) with its corresponding display string so that it can perform list selections based on data values rather than string values.

Lists can be either single selection or multi-selection. The two types require slightly different forms of the get and set methods. The set and get methods for a single selection list take and return a single value representing the selected value. The set and get methods for a multi-selection list take and return an array of selected values. Every time the selection changes in a multi-selection list, the entire set of selected items is return, even if some of the items were already selected.

Data Bindings

Iterator getXXXList( )—Called by the binder to retrieve the list of elements to display in the drop-down list. The getXXXList method is call to initially load the drop-down list, and subsequently reloads the list whenever a list change notification is posted with the moniker of the component. All elements in the returned list must be of the same type (or a subtype of) the first element in the list.

type getXXX( )—Returns the value of the bound data element in the model. This is the version used by single-selection lists. Called by the binder to update the selection displayed in the list component from the value of the bound data element in the model. The return value can be of any type (typically a model-defined type), but it must match the element type returned by the getXXXList method. The return value is compared to the binder's list of stored data objects (via equals( )) to select the corresponding item in the list. If no matching data object is found (or null is returned), the existing list selection is removed and the list component is considered to have no selection.

type[ ] getXXX( )—Returns the value of the bound data element in the model as an array. This is the version used by multi-selection lists. The bound data element can be a collection of any sort (e.g., array, Vector, List, Hashmap, etc. . . . ) but this get method must return an array (this implies that a conversion may need to be done to convert from the model's collection type to an array). Called by the binder to update the selection displayed in the list component from the value of the bound data element in the model. The return value is an array of any type (typically a model-defined type), but it must match the element type returned by the getXXXList method. The values returned in the array are compared to the binder's list of stored data objects (via equals( )) to select the corresponding items in the list. If no matching data objects are found (or null is returned), the existing list selections are removed and the list component is considered to have no selection.

void setXXX(type value)—Sets the value of the bound data element in the model. This is the version used by single-selection lists. Called by the binder to update the value of the bound data element in the model from the selection in the list component. The argument type can be of any type, but it must match the type returned by the getXXX method. If there is no selection in the list component, the argument value is null.

void setXXX(type[ ] value)—Sets the value of the bound data element in the model. This is the version used by multi-selection lists. The bound data element can be a collection of any sort (e.g., array, Vector, List, Hashmap, etc. . . . ) but this set method accept an array as an argument (this implies that a conversion may need to be done to convert from an array to the model's collection type). Called by the binder to update the value of the bound data element in the model from the selection in the list component. The argument type can be of any type, but it must match the type returned by the getXXX method. If there is no selection in the drop-down list component, the argument value is an empty array.

boolean setXXX(type value)—Alternative form of the setXXX method. This version returns a boolean value indicating if the set operation was successful. This allows the setXXX method to perform rudimentary edits to determine the validity of the argument. A return value of true indicates the argument was accepted, while false indicates the argument was rejected. If false is returned, the binder responds by notifying the user that an error occurred (see onXXX_SetException).

boolean setXXX(type[ ] value)—Alternative form of the setXXX method for multi-selection lists. See previous method for more information.

boolean isXXX_Valid( )—Determines if the bound data element in the model is valid for the current state of the model.

If this method returns true, the list component is enabled. If false, the table component is disabled.

Event Bindings void onXXX_SelChange( )—Called by the binder whenever the selection in the list changes. This method allows custom and/or additional processing for list selection events.
  Note: Implementing this method is not recommended for most situations as the standard getXXX/setXXX binding protocol is sufficient to handle most list selection events.
void onXXX Action( )—Called by the binder to invoke the action event for the list component. The action event is triggered whenever the user double-clicks the mouse pointer on an element in the list or presses the action activation key (typically the enter key or the space bar) while the list component has focus.

Auxiliary Bindings void onXXX_SetException(Object value)—Called by the binder to handle an exception in the setXXX method, i.e., the setXXX method returned false. The argument is the same argument that was passed to the setXXX method. This method allows custom and/or additional processing for handling a set exception. If the binder fails to bind to a onXXX_SetException method, the default behavior is to beep.
String getXXXDisplayString(Object o)—Called by the binder to translate a list item returned by the getXXXList method into a suitable display string. This method allows display strings for list item to be customized. The list item object is passed as the argument. The method should return a String containing the appropriate text to display in the drop-down list for that object.
  If the binder fails to bind to a getXXXDisplayString method, the default behavior is to do a toString on the list item object.

Table Component

AWT: N/A

Swing: JTable

An table component displays a 2-dimensional table of values (organized in rows and columns) and allows the user to select one or more rows from the table. Each row in the table is represented by a single object. The column values in a row are represented by the various fields of the row object.

Table components have an additional requirement to populate the table with rows. The table is populated by binding to a getXXXList method that returns an Iterator over the collection of objects to display in the table. The objects can be of any type (usually they are of a model-defined type), but they all must be of the same basic type.

The table component must also know what fields in the row objects to display as columns. To do this, the table binder will attempt to bind to a getXXXColumns method that returns an array of strings that contains the monikers of the column fields in a row object. A row object must implement a getYYY method for each column field (where YYY is the moniker for a column) that returns the value for that column.

The column values can be of any type, the binder will translate them into Strings suitable for display in the table. It will do it first by attempting to bind to a formatYYYColumn method to translate the column value into a String (where YYY is the moniker for a column). If that fails, it will simply do a toString( ) on the column value.

The table component may also need to display column headers. To do this the table binder will attempt to bind to a getXXXColumnHeaders method that returns an array of strings that contain the header text for each column. If that fails, it will simply display the column moniker as the column header.

Tables can be either single selection or multi-selection. The two types require slightly different forms of the get and set methods. The set and get methods for a single selection table take and return a single value representing the selected row object. The set and get methods for a multi-selection table take and return an array of selected row objects. Every time the selection changes in a multi-selection table, the entire set of selected row objects is returned, even if some of the row objects were already selected.

Note: Although JTable is designed to support both row-oriented (data table style) and cell-oriented (spreadsheet style) tables, this binding supports only row-oriented JTables.

Data Bindings

Iterator getXXXList( )—Called by the binder to retrieve the list of objects to display in the table. The getXXXList method is call to initially load the table, and subsequently reloads the table whenever a list change notification is posted with the moniker of the component. All elements in the returned list must be of the same type (or a subtype of) the return type of the getXXX method.
type getXXX( )—Returns the value of the bound data element in the model. This is the version used by single-selection lists. Called by the binder to update the selection displayed in the table component from the value of the bound data element in the model. The return value can be of any type (typically a model-defined type), but it must match the element type returned by the getXXXList method. The return value is compared to the binder's list of stored data objects (via equals( )) to select the corresponding row in the table. If no matching data object is found (or null is returned), the existing table selection is removed and the table component is considered to have no selection.
type[ ] getXXX( )—Returns the value of the bound data element in the model as an array. This is the version used by multi-selection tables. The bound data element can be a collection of any sort (e.g., array, Vector, List, Hashmap, etc. . . . ) but this get method must return an array (this implies that a conversion may need to be done to convert from the model's collection type to an array). Called by the binder to update the selection displayed in the table component from the value of the bound data element in the model. The return value is an array of any type (typically a model-defined type), but it must match the element type returned by the getXXXList method. The values returned in the array are compared to the binder's list of stored data objects (via equals( )) to select the corresponding rows in the list. If no matching data objects are found (or null is returned), the existing table selections are removed and the list component is considered to have no selection.
void setXXX(type value)—Sets the value of the bound data element in the model. This is the version used by single-selection tables. Called by the binder to update the value of the bound data element in the model from the selection in the table component. The argument type can be of any type, but it must match the type returned by the getXXX method. If there is no selection in table component, the argument value is null.
void setXXX(type[ ] value)—Sets the value of the bound data element in the model. This is the version used by multi-selection lists. The bound data element can be a collection of any sort (e.g., array, Vector, List, Hashmap, etc. . . . ) but this set method accept an array as an argument (this implies that a conversion may need to be done to convert from an array to the model's collection type). Called by the binder to update the value of the bound data element in the model from the selection in the list component. The argument type can be of any type, but it must match the type returned by the getXXX method. If there is no selection in the drop-down list component, the argument value is an empty array.

boolean setXXX(type value)—Alternative form of the setXXX method. This version returns a boolean value indicating if the set operation was successful. This allows the setXXX method to perform rudimentary edits to determine the validity of the argument. A return value of true indicates the argument was accepted, while false indicates the argument was rejected. If false is returned, the binder responds by notifying the user that an error occurred (see onXXX_SetException).

boolean setXXX(type[ ] value)—Alternative form of the setXXX method for multi-selection lists. See previous method for more information.

boolean isXXX_Valid( )—Determines if the bound data element in the model is valid for the current state of the model. If this method returns true, the table component is enabled. If false, the table component is disabled.

String[ ] getXXXColumns( )—Called by the binder to retrieve an array of column monikers. The binder will use the names in this array to bind to get methods in a row object for each column in the table. The order of the elements in the array dictate the order the monikers appear in the table from, left to right (i.e., element 0 corresponds to the left-most column, element 1 is the next column to the right, etc. . . . ). This method is only bound in the UI class. It does not bind to the bound data object. If the binder fails to bind to this method, it assumes that the table has a single column whose value is returned by getXXX method.

type getYYY( )—Returns the value of the column in a row object identified with the YYY moniker. The return value can be of any type, typically it is a model-defined type. This method is only bound in each row object returned by the getXXXList method.

Event Bindings void onXXX_SelChange( )—Called by the binder whenever the selection in the table changes. This method allows custom and/or additional processing for list selection events.
  Note: Implementing this method is not recommended for most situations as the standard getXXX/setXXX binding protocol is sufficient to handle most table selection events.

void onXXX_Action( )—Called by the binder to invoke the action event for the table component. The action event is triggered whenever the user double-clicks the mouse pointer on a row in the table or presses the action activation key (typically the enter key or the space bar) while the table component has focus.

Auxiliary Bindings void onXXX_SetException(Object value)—Called by the binder to handle an exception in the setXXX method, i.e., the setXXX method returned false. The argument is the same argument that was passed to the setXXX method. This method allows custom and/or additional processing for handling a set exception. If the binder fails to bind to a onXXX_SetException method, the default behavior is to beep.

String[ ] getXXXColumnHeaders( )—Called by the binder to retrieve an array of column headers. The binders displays these strings in the headers for each column. The order of the elements in the array must match the order the columns appear in the table (as specified by the order the monikers appear in the getXXXColumns method).
  This method is only bound in the UI class. It does not bind to the bound data object. If the binder fails to bind to this method, it assumes that the table has a single column whose header is the tables moniker (i.e., 'XXX').

String formatYYYColumn(Object data)—Called by the binder to perform custom formatting for the column identified by the YYY moniker. The column data value is passed in as the argument.
  This method is only bound in the UI class. It does not bind to the bound data object. If the binder fails to bind to this method, it simply does a toString on the column data value).

Slider Component

AWT: N/A

Swing: JSlider

A Slider component allows the user to select a value from a pre-defined range of values by moving a sliding selector in the component. A slider always displays a numeric value, but that numeric value can be represented by any JAVA® numeric type (char, short, int, long, float, double, or their corresponding wrapper classes).

In addition to having a data value, a slider has a minimum and maximum value. These values can be obtained from the model by implemented the getXXXMinValue and getXXXMaxValue methods. If these methods are not implemented, the default minimum and maximum values are 0 and 100.

The minimum and maximum values can be updated dynamically by posting a data change notification with the moniker "XXXMinValue" and "XXXMaxValue" (Where 'XXX' is the data element/component moniker).

Data Bindings type getXXX( )—Returns the value of the bound data element in the model. Called by the binder to update the value displayed by the slider component from the value of the bound data element in the model. The return numeric value must be numeric but can be any JAVA® numeric type (char, short, int, long, float, double, or their corresponding wrapper classes).

void setXXX(type value)—Sets the value of the bound data element in the model. Called by the binder to update the value of the bound data element in the model from the value in the slider component. The argument type must of the same numeric type as returned by the getXXX method.

boolean setXXX(type value)—Alternative form of the setXXX method. This version returns a boolean value indicating if the set operation was successful. This allows the setXXX method to perform rudimentary edits to determine the validity of the argument. A return value of true indicates the argument was accepted, while false indicates the argument was rejected. If false is returned, the binder responds by notifying the user that an error occurred (see onXXX_SetException).

boolean isXXX_Valid( )—Determines if the bound data element in the model is valid for the current state of the model. If this method returns true, the slider component is enabled. If false, the checkbox component is disabled.

Event Bindings void onXXX_ValueChange( )—Called by the binder whenever the value of the slider component changes. This method allows custom and/or additional processing slider value change events.

Note: Implementing this method is not recommended for most situations as the standard getXXX/setXXX binding protocol is sufficient to handle most value change events.

Auxiliary Bindings void onXXX_SetException(Object value)—Called by the binder to handle an exception in the setXXX method (see setXXX), i.e., the setXXX method returned false. The argument is the same argument that was passed to the setXXX method. This method allows custom and/or additional processing for handling a set exception. If the binder fails to bind to a onXXX_SetException method, the default behavior is to beep.

type getXXXMinvalue( )—Returns the minimum value for the allowed range of the bound data element in the model. Called by the binder to initialize/update the minimum value displayed by the slider component from the value of the bound data element in the model. The return numeric value must be numeric but can be any JAVA® numeric type (char, short, int, long, float, double, or their corresponding wrapper classes).

type getXXXMaxValue( )—Returns the maximum value for the allowed range of the bound data element in the model. Called by the binder to initialize/update the maximum value displayed by the slider component from the value of the bound data element in the model. The return numeric value must be numeric but can be any JAVA® numeric type (char, short, int, long, float, double, or their corresponding wrapper classes).

Progress Indicator Component

AWT: N/A

Swing: JProgressBar

A progress indicator component display a graphical representation for the progress of some operation (typically a horizontal bar). A progress indicator component is inherently read-only, so it has no setXXX or related bindings. The data value of a progress indicator is assumed to be of type int or Integer.

In addition to having a data value, a progress indicator has a minimum and maximum value. These values can be obtained from the model by implemented the getXXXMinValue and getXXXMaxValue methods. The minimum and maximum values are assumed to be of type int or Integer. If these methods are not implemented, the default minimum and maximum values are 0 and 100.

The minimum and maximum values can be updated dynamically by posting a data change notification with the moniker "XXXMinValue" and "XXXMaxValue" (Where 'XXX' is the data element/component moniker).

Data Bindings int getXXX( )—Returns the value of the bound data element in the model. Called by the binder to update the value displayed in the progress indicator component from the value of the bound data element in the model.

boolean isXXX_Valid( )—Determines if the bound data element in the model is valid for the current state of the model. For progress indicator components, this method has no effect.

Event Bindings

Progress indicator components are passive and generate no events.

Auxiliary Bindings int getXXXMinValue( )—Returns the minimum value for the allowed range of the bound data element in the model. Called by the binder to initialize/update the minimum value displayed by the progress indicator component from the value of the bound data element in the model.

int getXXXMaxValue( )—Returns the maximum value for the allowed range of the bound data element in the model. Called by the binder to initialize/update the maximum value displayed by the progress indicator component from the value of the bound data element in the model.

Although the present invention has been described primarily with reference to a JAVA® implementation, the present invention is not limited to JAVA®, but may be implemented in any Object Oriented Programming language that implements a run-time introspection capability similar to that found in JAVA® (e.g., a facility called "reflection").

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for automated binding of an application user interface to the data manipulated by the user interface, the method comprising:

responsive to instantiating an application user interface, constructing a binder object for at least one component in the application user interface;

registering the binder object with a notification dispatcher as a data change and state change listener of the model for the moniker of the user interface component;

mediating with the binder object the exchange of data between the at least one component and a corresponding field in the model;

registering the binder with the user interface component, with the binder being registered as a listener for various events that the user interface component can generate;

synthesizing method names with the binder;

locating the methods in the model that match the synthesized method names; and searching for and binding to an appropriate method that returns the current state of a field in the model;

whereby the step of searching for and binding includes automatically dynamically interrogating the application user interface at run time to discover a method running therein and, assigning a moniker to a discovered method, the moniker being formed by appending at least one of a predetermined suffice and a predetermined prefix, to the discovered method name.

2. The method as recited in claim 1, wherein:
the methods comprise the getter, setter, and "is-valid" methods;
locating the methods in the model comprises locating the getter and setter methods in the model; and
searching for and binding to an appropriate method comprises searching for and binding to an "is-valid" method.

3. The method as recited in claim 2, wherein the step of automatically dynamically interrogating utilizes introspection to find the getter, setter, and the is-valid methods in the model.

4. The method as recited in claim 1, further comprising:
responsive to a determination that data in the user interface component has changed, receiving, at the binder, the event, retrieving, with the binder, the new value, and updating, using the binder, the value in the model.

5. The method as recited in claim 1, further comprising:
responsive to a determination that data in the model has changed,
sending, from the model, a data change notification using the moniker of the field that changed via the notification dispatcher, and
receiving, at the binder, the notification, calling, with the binder, the bound getter to retrieve the new value from the model, and updating, using the binder, the user interface component.

6. The method as recited in claim 5, further comprising:
performing, with the binder, one of enabling and disabling a corresponding user interface component based on the returned Boolean value.

7. The method as recited in claim 1, further comprising:
responsive to a determination that a state change occurred in the model,
sending, from the model, a state change notification;
receiving the notification at the binder; and
getting, at the binder, a Boolean value indicating the applicable state of the field in the model.

8. The method as recited in claim 1, further comprising:
responsive to a determination that an event occurred in the user interface component,
receiving, at the binder, an appropriate user interface event notification;
synthesizing, with the binder, an event-handling method name, and searching, with the binder, the application user interface for the method.

9. The method as recited in claim 8, further comprising:
responsive to a determination that the method is found, calling, with the binder, the event-handling method.

10. The method as recited in claim 1, wherein the method comprise at least one of a data method, an event method, and an auxiliary method.

11. The method as recited in claim 10, wherein the data method comprises one of a get method, a set method, an "is valid" method, and methods for populating components.

12. The method as recited in claim 11, wherein the methods for populating components comprise "get-list" methods.

13. The method as recited in claim 10, wherein the event method comprises handle user interface events generated by the various components in the user interface.

14. The method as recited in claim 13, wherein the event method is bound to a method in the view object.

15. The method as recited in claim 10, wherein the auxiliary method comprises methods that provide one of auxiliary information and handle binder-generated notifications.

16. The method as recited in claim 10, wherein the auxiliary method handles at least one of validation of the maximum length of a text field, handle errors detected by the binder, and provide monikers for table columns.

17. A computer readable recordable type media storing computer program instructions, which when executed cause a computer to:
construct a binder object for at least one component in the application user interface responsive to instantiating an application user interface;
register the binder object with a notification dispatcher as a data change and state change listener of the model for the moniker of the user interface component;
mediate with the binder object the exchange of data between the at least one component and a corresponding field in the model;
register the binder with the user interface component, with the binder being registered as a listener for various events that the user interface component can generate;
synthesize method names with the binder;
locate methods in the model that match the synthesized method names; and
dynamically search the at least one component of the application user interface at run time, for methods running therein and, assigning a moniker to a discovered method, the moniker being formed by appending at least one of a predetermined suffice and a predetermined prefix, to the discovered method name and bind to an appropriate method that returns the current state of a field in the model.

18. The computer readable recordable type media as recited in claim 17, wherein:
the methods comprise the getter, setter, and "is-valid" methods;
locating the methods in the model comprises locating the getter and setter methods in the model; and
searching for and binding to an appropriate method comprises searching for and binding to an "is-valid" method.

19. The computer readable recordable type media as recited in claim 18, wherein the binder utilizes introspection to find the getter, setter, and the is-valid methods in the model.

20. The computer readable recordable type media as recited in claim 17, further comprising computer program instructions, which when executed cause a computer to:
determine that data in the user interface component has changed, receive at the binder, the event, retrieve with the binder, the new value, and update using the binder, the value in the model.

21. The computer readable recordable type media recited in claim 17, further comprising:
instructions for, responsive to a determination that data in the model has changed,
sending, from the model, a data change notification using the moniker of the field that changed via the notification dispatcher, and
receiving, at the binder, the notification, calling, with the binder, the bound getter to retrieve the new value from the model, and updating, using the binder, the user interface component.

22. The computer readable recordable type media as recited in claim 17, further comprising:
instructions for, responsive to a determination that a state change occurred in the model,
sending, from the model, a state change notification;

receiving the notification at the binder; and getting, at the binder, a Boolean value indicating the applicable state of the field in the model.

23. The computer readable recordable type media as recited in claim 22, further comprising:

instructions for performing, with the binder, one of enabling and disabling a corresponding user interface component based on the returned Boolean value.

24. The computer readable recordable type media as recited in claim 17, further comprising:

instructions for, responsive to a determination that an event occurred in the user interface component, receiving, at the binder, an appropriate user interface event notification;

synthesizing, with the binder, an event-handling method name, and searching, with the binder, the application user interface for the method.

25. The computer readable recordable type media as recited in claim 24, further comprising:

instructions for, responsive to a determination that the method is found, calling, with the binder, the event-handling method.

26. The computer readable recordable type media as recited in claim 17, wherein the method comprise at least one of a data method, an event method, and an auxiliary method.

27. A system for automated binding of an application user interface to the data manipulated by the user interface, the system comprising:

a processor; and memory operatively coupled to the processor, the memory storing program instructions, which when executed cause the processor to:

construct a binder object for at least one component in the application user interface, responsive to instantiating an application user interface;

mediate with the binder object the exchange of data between the at least one component and a corresponding field in the model;

register the binder object with a notification dispatcher as a data change and state change listener of the model for the moniker of the user interface component;

register the binder with the user interface component, with the binder being registered as a listener for various events that the user interface component can generate;

synthesize method names with the binder;

locate at run time by dynamically interrogating the at least one component of the application user interface, methods in the model that match the synthesized method names; and search for and bind to an appropriate method that returns the current state of a field in the model, the binding being comprised of assigning a moniker to the at least one component of the application user interface and the appending of at least one of a prefix and a suffix to use in locating a corresponding method in the model.

28. The system as recited in claim 27, wherein:

the methods comprise the getter, setter, and "is-valid" methods;

locating the methods in the model comprises locating the getter and setter methods in the model; and searching for and binding to an appropriate method comprises searching for and binding to an "is-valid" method.

29. The system as recited in claim 28, wherein the binder utilizes introspection to find the getter, setter, and the is-valid methods in the model.

30. The system as recited in claim 27, further comprising computer program instructions which when executed cause the processor to:

determine that data in the user interface component has changed, receiving, at the binder, the event, retrieving, with the binder, the new value, and updating, using the binder, the value in the model.

31. The system method as recited in claim 27, further comprising computer program instructions which when executed cause the processor to:

responsive to a determination that data in the model has changed, send from the model, a data change notification using the moniker of the field that changed via the notification dispatcher, and receive at the binder, the notification, calling, with the binder, the bound getter to retrieve the new value from the model, and updating, using the binder, the user interface component.

32. The system as recited in claim 27, further comprising computer program instructions which when executed cause the processor to:

responsive to a determination that a state change occurred in the model, send, from the model, a state change notification;

send the notification at the binder; and get at the binder, a Boolean value indicating the applicable state of the field in the model.

33. The system as recited in claim 32, further comprising computer program instructions which when executed cause the processor to:

perform with the binder, one of enabling and disabling a corresponding user interface component based on the returned Boolean value.

34. The system as recited in claim 27, further comprising computer program instructions which when executed cause the processor to:

responsive to a determination that an event occurred in the user interface component, receive at the binder, an appropriate user interface event notification;

synthesize with the binder, an event-handling method name, and searching, with the binder, the application user interface for the method.

35. The system as recited in claim 34, further comprising computer program instructions which when executed cause the processor to:

responsive to a determination that the method is found, call with the binder, the event-handling method.

36. The system as recited in claim 27, wherein the method comprise at least one of a data method, an event method, and an auxiliary method.

* * * * *

UNITED STATES PATENT AND TRADEMARK OFFICE
CERTIFICATE OF CORRECTION

| | | |
|---|---|---|
| PATENT NO. | : 7,571,425 B2 | Page 1 of 1 |
| APPLICATION NO. | : 10/993562 | |
| DATED | : August 4, 2009 | |
| INVENTOR(S) | : Roger T. Lessly | |

It is certified that error appears in the above-identified patent and that said Letters Patent is hereby corrected as shown below:

In column 1, line 17, before "JAVA®" insert -- Inc., --.

In column 2, line 3, delete "Java" and insert -- JAVA® --, therefor.

In column 3, line 29, delete "FIG. 2" and insert -- FIG. 2A --, therefor.

In column 26, line 52, in Claim 21, after "media" insert -- as --.

In column 28, line 13, in Claim 31, after "system" delete "method".

Signed and Sealed this

Thirtieth Day of March, 2010

David J. Kappos
*Director of the United States Patent and Trademark Office*